United States Patent
Braida et al.

(10) Patent No.: US 8,543,466 B1
(45) Date of Patent: Sep. 24, 2013

(54) ON-DEMAND DIGITAL ASSETS HOSTING SERVICE

(75) Inventors: Andrea Elena Braida, Seattle, WA (US); Daniel Jonathan Scarfe, Berkshire (GB)

(73) Assignee: Point Sample LLC, Seattle, WA (US)

( * ) Notice: Subject to any disclaimer, the term of this patent is extended or adjusted under 35 U.S.C. 154(b) by 21 days.

(21) Appl. No.: 13/429,216

(22) Filed: Mar. 23, 2012

(51) Int. Cl.
*G06Q 30/00* (2012.01)

(52) U.S. Cl.
USPC ........................................................ 705/26.1

(58) Field of Classification Search
USPC ........................................................ 705/26.1
See application file for complete search history.

(56) References Cited

U.S. PATENT DOCUMENTS

2009/0177538 A1* 7/2009 Brewer et al. .................. 705/14

OTHER PUBLICATIONS

Creative Review, "Own a Colour, Save a Life," Sep. 29, 2011, three pages. [Online] [Retrieved May 16, 2012] Retrieved from the Internet <URL:http://www.creativereview.co.uk/cr-blog/2011/september/dulux-own-a-colour.>

Ownacolor.com, "About Own a Color," May 3, 2012, two pages. [Online] [Retrieved May 16, 2012] Retrieved from the Internet <URL:http://www.ownacolour.com/overlays/about>.

Ownacolor.com, "Getting Started," 2012, one page. [Online] [Retrieved May 16, 2012] Retrieved from the Internet <URL:http://www.ownacolour.com/#like_38cd71.>

* cited by examiner

*Primary Examiner* — Mila Airapetian
(74) *Attorney, Agent, or Firm* — Fenwick & West LLP

(57) ABSTRACT

A system provides on-demand digital assets hosting services to one or more users. The system receives a user selection of a digital representation (e.g., a digital image) of a digital asset, where the digital representation of the digital asset can be divided into multiple pixel blocks and the each pixel block represents a portion of the digital representation for purchase or donation. The system then tracks user's zoom level of the digital representation while the user browses the digital representation. Based on the zoom level, the method dynamically generates a zoomed version of the digital representation. Responsive to user selecting a pixel block of the digital representation and size of the pixel block, the system calculates the number of pixels contained in the selected pixel block, displays the selected pixel block and prepares the user to check out the purchase of the selected pixel block.

20 Claims, 12 Drawing Sheets

ON-DEMAND DIGITAL ASSETS HOSTING SERVICE

BACKGROUND

Described embodiments relate generally to web-based digital assets hosting service and specifically to on-demand digital assets hosting service based on user selections of portions of digital assets.

The Internet has transformed many communication norms, creating more efficiency for both individual users and businesses. An important part of the transformation is from digitization of traditional mass media products (e.g., objects, images, sound, documents and signals) to create digital assets. A digital asset is an item of text or media (e.g., sound, images) that has been formatted into a digital binary source that includes the right to use it.

The Internet and digitization have provided users with rich opportunities to effectively manage, store and share the digitized assets. However, it is still a challenge for digital rights owners to effectively monetize their digital assets. For example, museums often possess large collections of art (e.g., paintings, sculptures and antiques) and often rely on donations to maintain the collections. Museums are constantly facing fundraising challenges—suffering from huge government funding cuts—and need new, innovative ways to raise funds.

Given the transition to online activity and an emerging trend in philanthropy, there is a demand for a more donor-centric experience, which engages potential donors online in new and community building ways.

SUMMARY

A method, system and computer program product provides on-demand digital assets hosting service based on user selections of portions of the digital assets.

In one embodiment, a computer system provides on-demand digital assets hosting services to one or more users. The system receives a user selection of a digital representation (e.g., a digital image) of a digital asset, where the digital representation of the digital asset is divided into multiple pixel blocks and each pixel block represents a portion of the digital representation for purchase. The system displays the selected digital representation of the digital asset on a display screen and tracks user's zoom level of the digital representation while zooming in or out of the digital representation. Based on the zoom level, the system dynamically generates a zoomed version of the digital representation. Responsive to user selecting a pixel block of the selected digital representation and size of the pixel block, the system calculates the number of pixels contained in the selected pixel block. The system displays the selected pixel block and prepares the user to complete the purchase of the selected pixel block.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

The figures depict various embodiments of the invention for purposes of illustration only. One skilled in the art will readily recognize from the following discussion that alternative embodiments of the structures and methods illustrated herein may be employed without departing from the principles of the invention described herein.

DETAILED DESCRIPTION

It is to be understood that the Figures and descriptions of the invention have been simplified to illustrate elements that are relevant for a clear understanding of the embodiments of the invention, while eliminating, for the purpose of clarity, many other elements found in a typical web-based video player and method of using the same. Those of ordinary skill in the art may recognize that other elements and/or steps are desirable and/or required in implementing the invention. However, because such elements and steps are well known in the art, and because they do not facilitate a better understanding of the embodiments, a discussion of such elements and steps is not provided herein. The disclosure herein is directed to all such variations and modifications to such elements and methods known to those skilled in the art.

Figure 1:
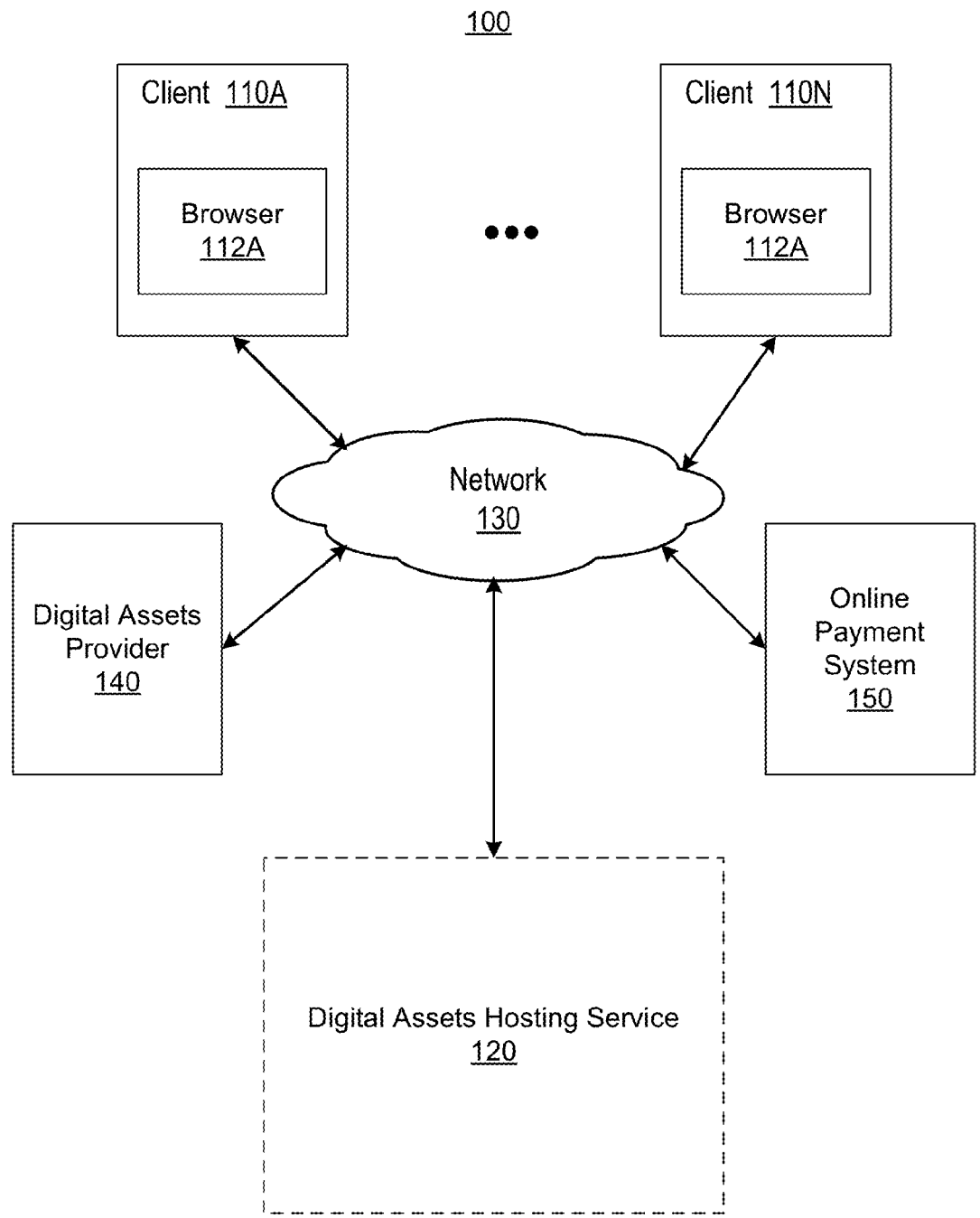
FIG. 1 is a block diagram of a computing environment 100 providing on-demand digital assets hosting service to clients.

FIG. 1 is a block diagram of a computing environment 100 providing on-demand digital assets hosting services to clients 110. Digital assets providers 140 (e.g., museums, charities) provide their digital assets (e.g., digital images of art collections) to the digital assets hosting service 120 for hosting and monetization. The hosting service 120 stores the received digital assets and presents digital assets selected by users for purchasing or donation. Each client 110 executes a browser 112 for browsing and selecting digital assets hosted by the digital assets hosting service 120. Multiple users/viewers use clients 110A-N to purchase or donate to the selected digital assets through an online payment system 150. Other embodiments can have different configurations. For example, the digital assets hosting service 120 can be implemented as a separate entity or as a part of operation within the digital assets provider 140 that provides the on-demand digital assets hosting services to its clients.

Turning to the individual entities illustrated on FIG. 1, each client 110 is used by a user to use services provided by the digital assets hosting service 120. For example, a user uses a client 110 to browse and select one or more portions of a digital asset. The client 110 may purchase (e.g., buy, donate or sponsor) the selected portions of the digital asset. The client 110 can be any type of computer device, such as a personal computer (e.g., desktop, notebook, and laptop) computer, as well as devices such as a mobile telephone or personal digital assistant that has the capability to record video content. The client 110 typically includes a processor, a display device (or output to a display device), a local storage, such as a hard drive or flash memory device, to which the client 110 stores data used by the user in performing tasks, and a network interface for coupling to the digital assets hosting services 120 via the network 130.

The network 130 enables communications among the clients 110, the digital assets hosting service 120, the digital assets provider 140 and an online payment system 150. In one embodiment, the network 130 is the Internet, and uses standardized internetworking communications technologies and protocols, known now or subsequently developed that enable the clients 110 to communicate with the digital assets hosting service 120. In another embodiment, the network 130 is a cloud computing network and includes one or more components of the digital assets hosting service 120.

The digital assets providers 140 (e.g., museums, charities) provide their digital assets (e.g., digital images of art collections) to the digital assets hosting service 120 for hosting and monetization. A digital asset (e.g., a digital image) can be divided into multiple portions, each of which is associated with a size and price specified by the digital assets owner. The digital assets owner can be the digital assets provider 140. If a digital asset has intellectual property rights associated with it, e.g., copyright, trademark right, the digital assets provider 140 also provides the intellectual property rights information of the digital asset to the hosting service 120.

In one embodiment, a digital asset is a high resolution digital representation of an asset, e.g., a high resolution digital image of a piece of art, and the digital representation of the asset has multiple pixels. A portion of a digital asset is represented by a pixel block of the digital asset. A pixel block of a digital asset is specified by its size, which can be defined in a variety of ways. For example, the size of a pixel block of a digital assets can be defined descriptively, e.g., small, medium and large. The size of a pixel block of a digital asset can be also defined numerically by the total number of pixels contained in the block. The size of a pixel block of a digital asset can be further defined by the dimensions (e.g., width and length) of the block. In the description below, the size of a pixel block of a digital asset is defined descriptively, e.g., small, medium and large, to simplify one embodiment of the invention.

For each pixel block of a digital asset, the digital assets provider 140 also specifies a price associated with the block. For example, the price for a small sized pixel block is half a dollar, one and half dollars for a medium sized one and three dollars for a large sized one. The price of a pixel block is a configurable design parameter, which can be changed by the digital assets provider 140, e.g., based on the needs and demands for the digital asset. For each digital asset to be hosted by the hosting service 120, the digital assets provider 140 provides the digital asset and its associated pixel block asset information (e.g., types of sizes, price/size and intellectual rights information) to the hosting service 120.

The online payment system 150 is configured to communicate with the digital assets hosting service 120 and to provide online fund transfer services to the hosting service 120. The online payment system 150 receives order information and payment method information associated with user selection of a pixel block of a digital asset from the hosting service 120 and performs payment processing for the hosting service 120. For example, responsive to a credit card payment method for an order, the online payment system 150 verifies the credit card to minimize fraud, connects to the issuer of the credit care and performs the credit card payment transaction.

Additionally, the online payment system 150 may perform revenue share distribution based on the instructions of the hosting service 120. Taking one time donation service toward a digital image provided by a museum as an example, for each revenue generated from a user donation of a selected pixel block of the digital image, the online payment system 150 distributes the revenue among the museum, the hosting service 120 and the online payment system 150 based on the revenue distribution instructions from the hosting service 120. In other embodiments, the online payment system 150 may provide different or additional online payment transaction services.

Figure 2:
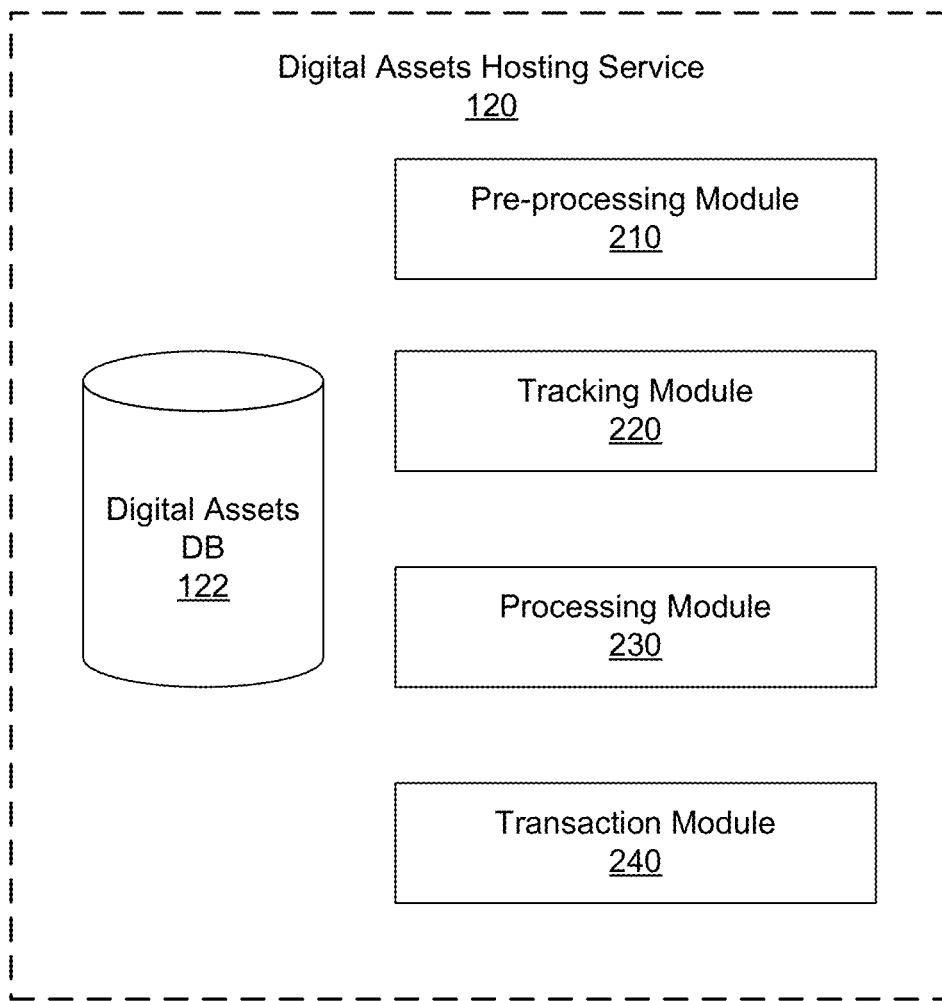
FIG. 2 is a block diagram of functional modules of a digital assets hosting service.

FIG. 2 is a block diagram of functional modules of the digital assets hosting service 120. The hosting service 120 receives digital assets and associated assets information from the digital assets provider 140, pre-processes the digital assets and stores the pre-processed digital assets in files/folders and assets information in the digital assets database 122. The hosting service 120 also receives user selections of the digital assets from the clients 110, tracks user selections of pixel blocks of a selected digital asset and processes the user selections and purchase/donation orders. The hosting service 120 interacts with the online payment system 150 to process user purchase/donation orders.

In the embodiment illustrated in FIG. 2, the digital assets hosting service 120 comprises a digital assets database 122, a pre-processing module 210, a tracking module 220, a processing module 230 and a transaction module 240. Other embodiments of the digital assets hosting service 120 may include other and/or different computer modules. To simplify description of one embodiment of the invention, digital images are used as an example of digital assets to describe one embodiment of the invention.

The pre-processing module 210 is configured to pre-process the digital assets and associated assets information received from the digital assets provider 140. In one embodiment, the pre-processing of a digital asset includes generating a pyramid of digital representations of the digital asset at different resolutions. For example, for a digital image of 1024×1024 pixels resolution, the pre-processing module 210 generates a pyramid of smaller resolution images of the digital image, e.g., at 512×512 pixels resolution, 256×256 pixels resolution, and other smaller resolution images (e.g., 8×8 pixels and 4×4 pixels).

In one embodiment, the pyramid of digital representations of a digital image is generated as a Deep Zoom image by a tool like DEEP ZOOM COMPOSER™. The deep zoom image of a digital image has multiple smaller images at different resolutions. Each of the smaller images is stored in a separate file and each level of the pyramid is stored in a separate folder in the digital assets database 122. The pyramid of digital representations of a digital image at different resolution allows the processing module 230 to fetch only those digital representations required for the size of the digital image currently displayed on a display screen, instead of downloading the entire digital image. For example, if a user zooms in to see only the highlighted middle part of a digital image, the processing module 230 loads only the highlighted smaller resolution images instead of an entire full resolution image.

The tracking module 220 tracks user selection of a digital image and zooming activities of the selected digital image. For example, the digital assets hosting service 120 presents a user multiple digital images for selection. In response to a user selection of a digital image, the hosting service 120 presents the selected digital image in a display screen, where the user can use a pointing device (e.g., a mouse) to zoom in or zoom out to view different portions of the selected digital image. The hosting service 120 dynamically generates a digital representation of the zoomed portion of the digital image based on the zoom level. In response to a user selection of a pixel block, the tracking module 220 records a location point (e.g., the coordinates of the top left corner of the block) of the selected block. The tracking module 220 also tracks user selection of size of pixel blocks for purchase or donation. The tracking module 220 interacts with the processing module 230 regarding the user selection of the size of the pixel block and location of the selected pixel block and stores the user selection of the size of the pixel block and location of the selected pixel block in the digital assets database 122.

The processing module 230 dynamically calculates the number of physical pixels contained in a selected pixel block based on user selection of the size of pixel block and the location of the pixel block. In one embodiment, the processing module 230 generates a dynamic grid of the digital image based on the zoom level and asset information (e.g., full resolution of the digital image) associated with the digital image. The processing module 230 queries the digital assets database 122 and displays the pixel blocks of the digital image which have been purchased or sponsored, and the portions of the digital image that are available to purchase or sponsor. In response to a user selection of a pixel block that has been purchased or sponsored, the processing unit 230 displays an error message. The user can mouse-over the available portions of the digital image and select the portion of the image for purchase or donation.

In response to a user selection of a pixel block, the processing module 230 displays a graphical user interface (GUI) to collect user information, such as user name. Through the interface, a user can upload a picture to be associated with the user name and type a text message associated with the selected pixel block. The processing module 230 can further provide an order information message board to display each user selection of pixel block.

The transaction module 240 is to collect purchase order information for each user selection of pixel block. In one embodiment, the transaction module 240 provides a graphical user interface to collect order information, such as purchaser name, address and payment method information. The transaction module 240 interacts with the online payment system 150 to complete the payment transaction of the user selected pixel blocks.

Figure 3:
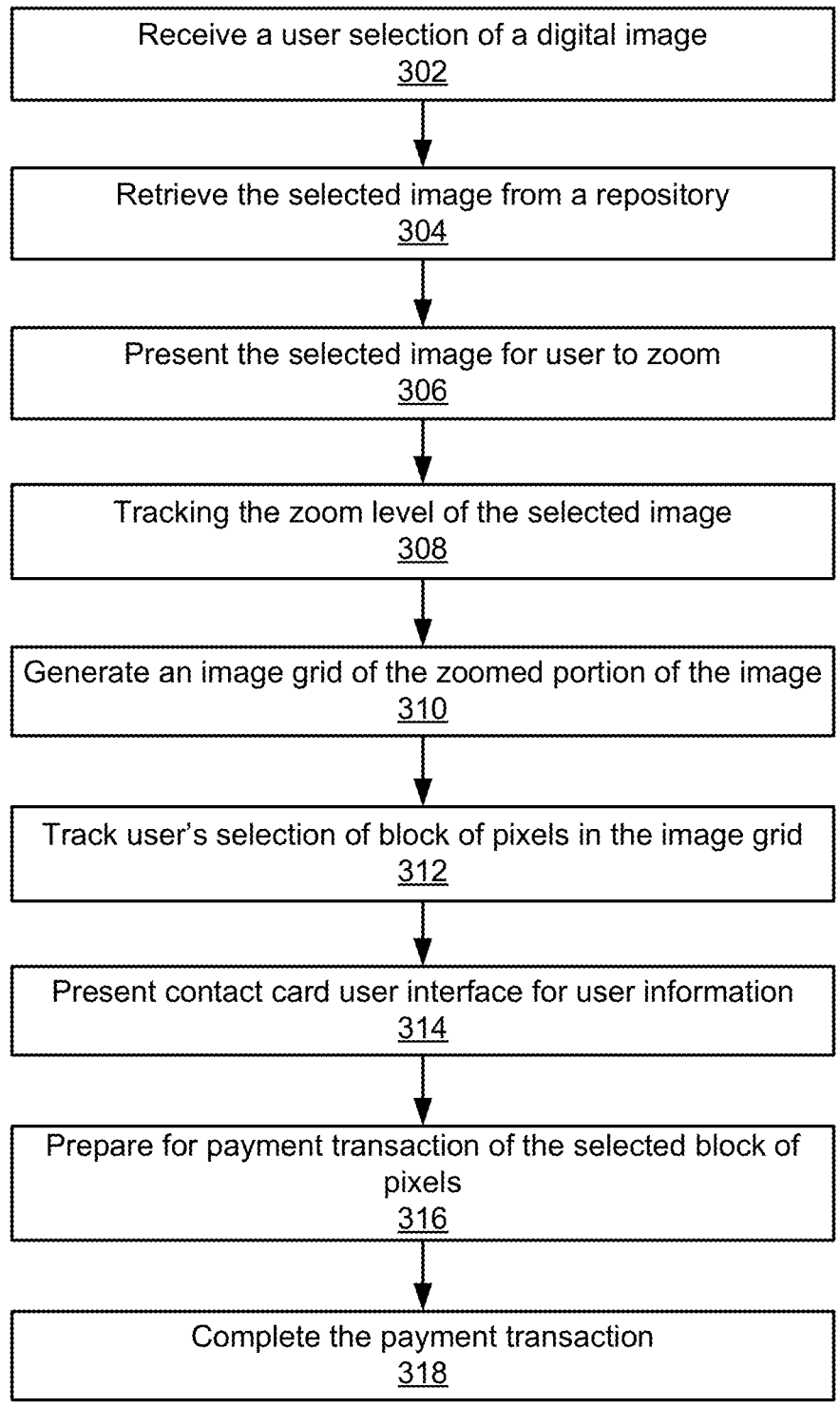
FIG. 3 is a flow chart of a process for providing on-demand digital assets hosting services to clients according to one embodiment of the invention.

FIG. 3 is a flow chart of a process for providing on-demand digital assets hosting services to clients according to one embodiment of the invention. Initially, the hosting service 120 receives 302 a user selection of a digital image and retrieves 304 the selected digital image from a repository (e.g., the digital assets database 122). The hosting service 120 presents 306 the user selected image in a display area, where the user can zoom in or out of the selected image. The hosting service 120 tracks 308 the zoom level of the selected image while the user zooms the selected image. Based on the zoom level and setting of the selected image (e.g., resolution of the image), the hosting service 120 generates 310 an image grid of the zoomed portion of the image.

The hosting service 120 further tracks 312 the user selection of pixel blocks in the image grid, where the tracking includes recording the location of the selected pixel block and size of pixel block that the user is to purchase or sponsor. For each user selection of a pixel block, the hosting service 120 presents 314 a contact card user interface to collect user information. The hosting service 120 prepares 316 for payment transaction of the selected pixel block of the digital image and communicates with an online payment system to complete 318 the payment transaction.

Figure 4:
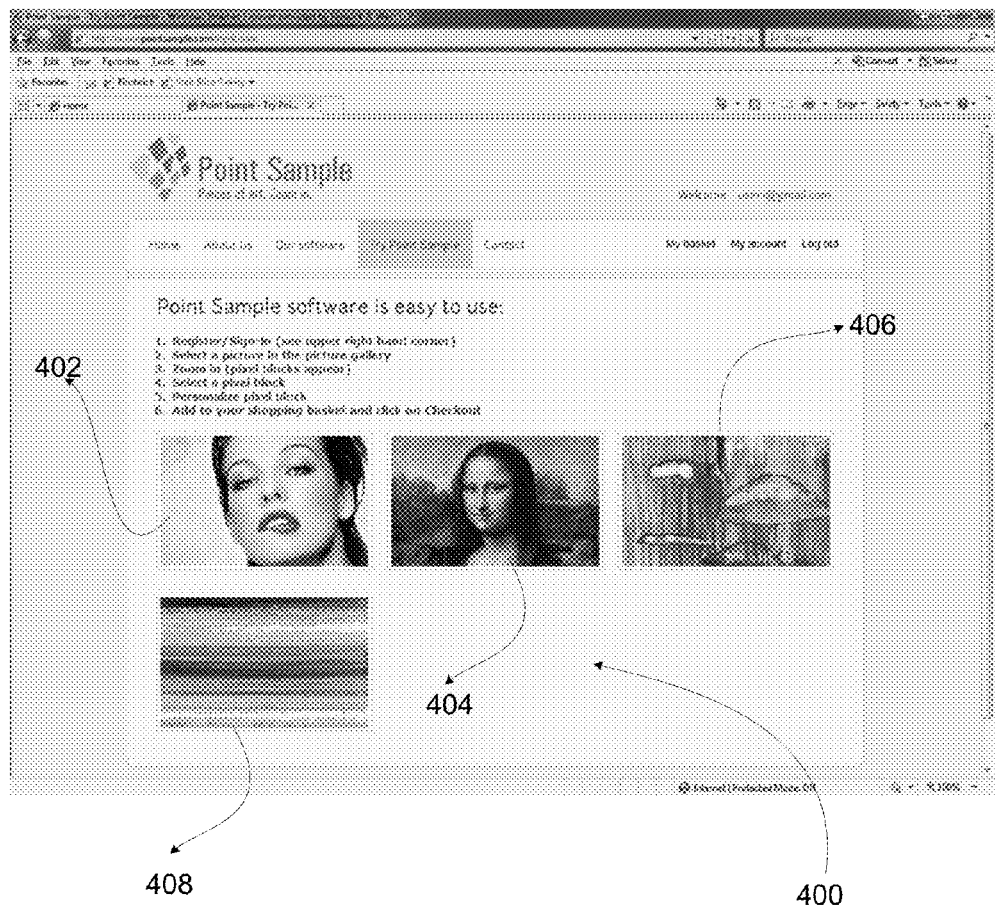
FIG. 4 is an example of a graphical user interface (GUI) for a user to select a digital image for purchase or donation.

To further illustrate one embodiment of the invention, FIGS. 4-12 are example screen shots in which an on-demand digital assets hosting service is provided to users. FIG. 4 is an example of a graphical user interface 400 for a user to select a digital image for purchase. In the example illustrated in FIG. 4, the hosting service 120 has four digital images 402, 404, 406 and 408 for a user to select. The digital images can be provided by digital assets providers 140 for users to purchase (if the assets provider has the right to sell the image) or sponsor. Each digital image can be divided into multiple different sized pixel blocks, and each size of a pixel block has a price specified by the digital image providers.

Figure 5:
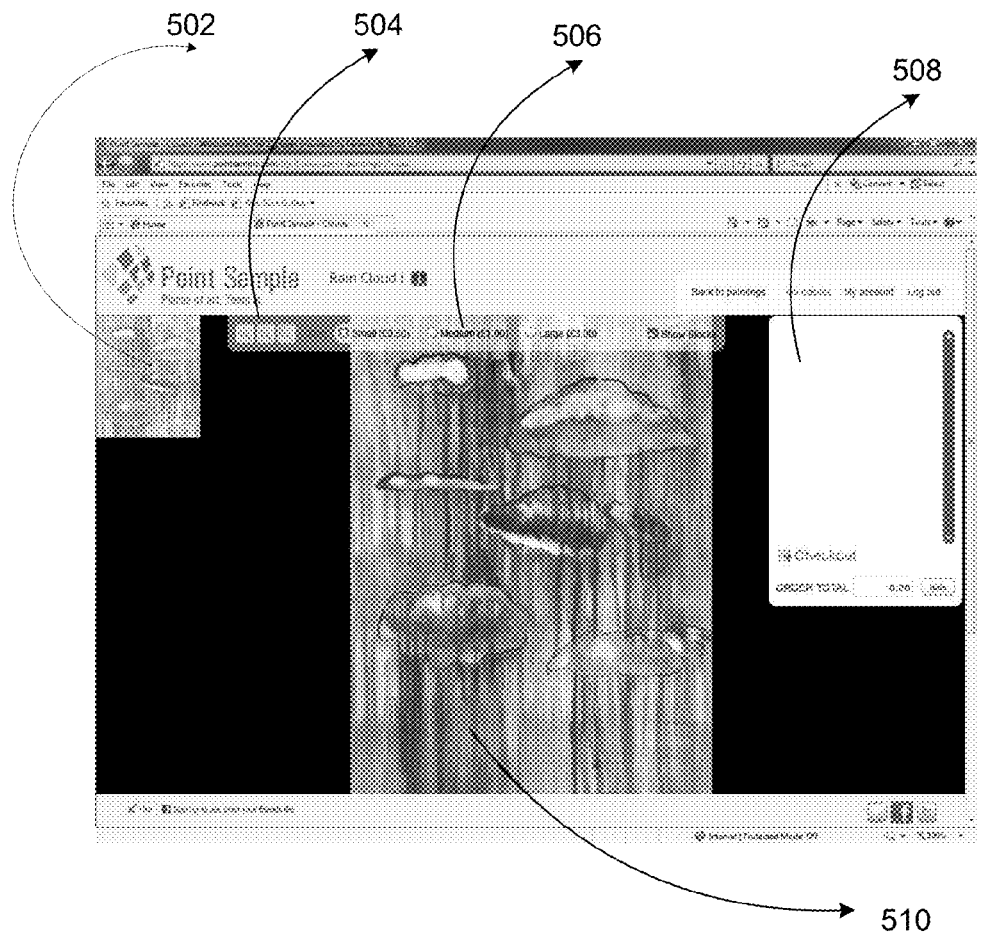
FIG. 5 is an example of a user interface for a user to zoom at different levels of a selected digital image.

In response to a user selection of a digital image, the hosting service 120 presents the selected image in a display screen. FIG. 5 is an example of a user interface for a user to zoom at different levels of a selected digital image, e.g., digital image 406. The hosting service 120 displays the selected digital image 406 in full resolution at the center of the display screen 510, and a zooming tracking display 502 at the left corner of the screen. The selected digital image 406 at a smaller resolution is displayed at the zooming tracking display 502. A user is provided three options 504 to zoom in, zoom out or view the selected image in the displayed resolution. A user can choose to purchase or sponsor different sized pixel blocks of the selected image, e.g., small, medium or large (section 506). A user is also provided a shopping basket 508 to display the order information.

Figure 6:
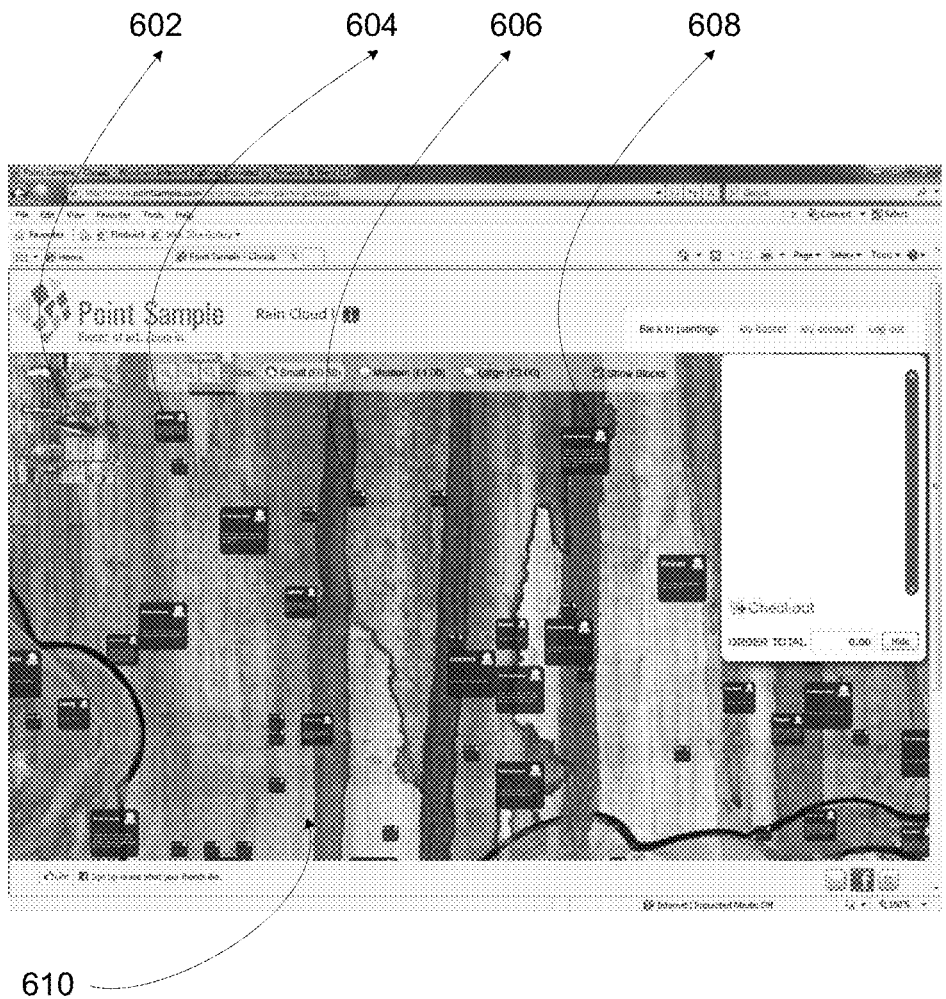
FIG. 6 is an example display of pixel blocks of a selected digital image, which have been purchased or sponsored.

Based on the zoom level selected by the user and setting of the selected image, the hosting service 120 generates a dynamic grid 610 of the selected image. FIG. 6 is an example display of portions of a selected digital image, which have been purchased or sponsored. Section 602 represents the current location of the selected image zoomed in by the user. Each rectangle (e.g., 604, 606 and 608) represents a pixel block that has been purchased or sponsored by a user, and size of the rectangle reflects the size of the pixel block selected by the user. For example, rectangle 606 is an example of a small size pixel block, rectangle 604 for a medium size pixel block and rectangle 608 for a large size pixel block. Each pixel block has a user name, an image associated with the user name if the user has uploaded one and a text message associated with the pixel block.

Figure 7:
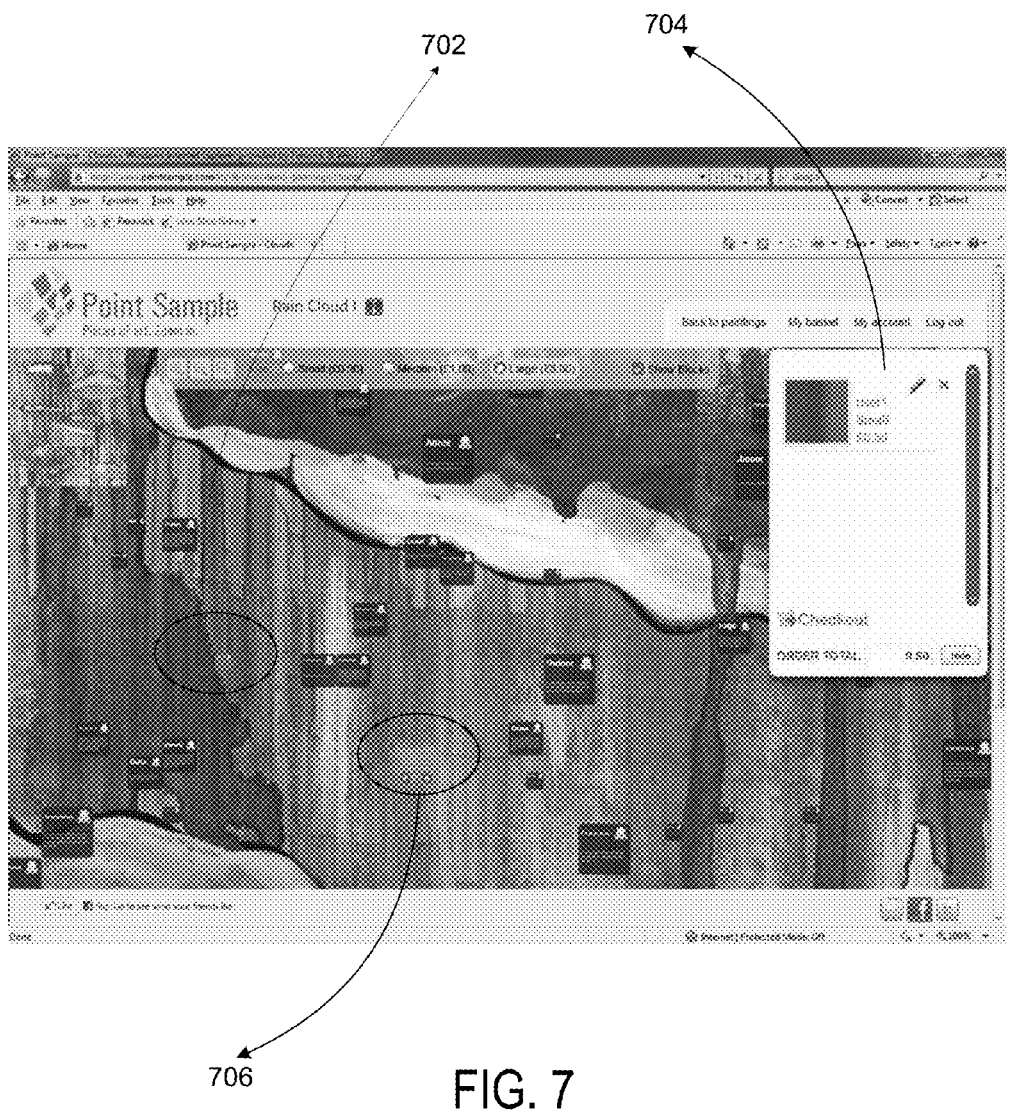
FIG. 7 is an example display of a digital image for a user to select a pixel block of the digital image for purchase.

Responsive to a user selection of a size of pixel block to purchase or sponsor, the hosting service 120 displays a symbol of shopping cart 706 at the location pointed by the user's mouse. FIG. 7 is an example display of a digital image for a user to select a portion of the digital image for purchase. Here, a user (e.g., user1) has purchased a small size pixel block 702, which is currently pending for checkout. The status of the selection is displayed in the shopping basket 704, which shows a thumbnail image of the pixel block, user name, size of the selected pixel block (e.g., small) and purchase price of the block (e.g., $0.50). The symbol of shopping cart 706 at the position pointed by the user's mouse corresponds to a pixel block available for purchase based on the user selection of the size of the pixel block.

Responsive to a user selection of a pixel block that has been purchased or sponsored, the hosting service 120 displays an error message and invites the user to make a new selection.

Figure 8:
FIG. 8 is an example of an error message page corresponding to an invalid user selection of a pixel block of a digital image.

FIG. 8 is an example of an error message page 802 corresponding to an invalid user selection of a pixel block. The example error message says, "The pixel block is already taken. Please select another one."

Figure 9:
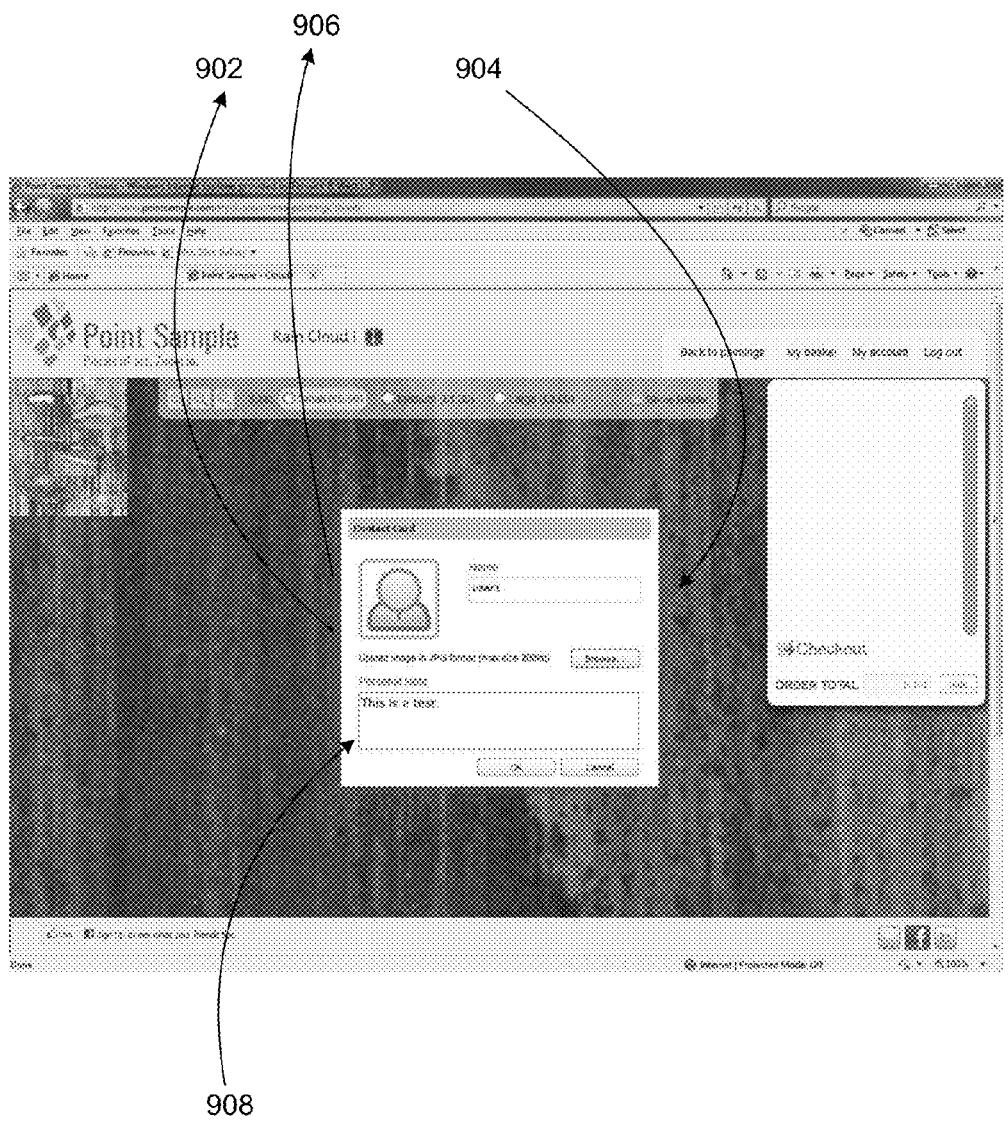
FIG. 9 is an example of a user interface to collect user information after a successful user selection.

FIG. 9 is an example of a user interface to collect user information after a successful user selection. Responsive to a successful user selection of a pixel block, the hosting service 120 presents a user contact card interface 902 to collect user contact information and to allow user to enter a text message associated with the selection. In one embodiment, the user interface 902 comprises a place 904 to enter user name and a place 906 to display a user picture, which can be retrieved from a local storage of the user's computer. The hosting service 120 can limit the file size of the user picture. Additionally, the user interface 902 also has a space 908 for the user to type a text message associated with the selection of the pixel block. Once the user completes the user information and the text message, the user clicks the "Okay" button for the hosting service 120 to save the information. The hosting service 120 reserves the pixel block for a period of time (e.g., 15 minutes). The 15-minute timer renews each time a new pixel block is placed in the user's shopping basket.

Figure 10:
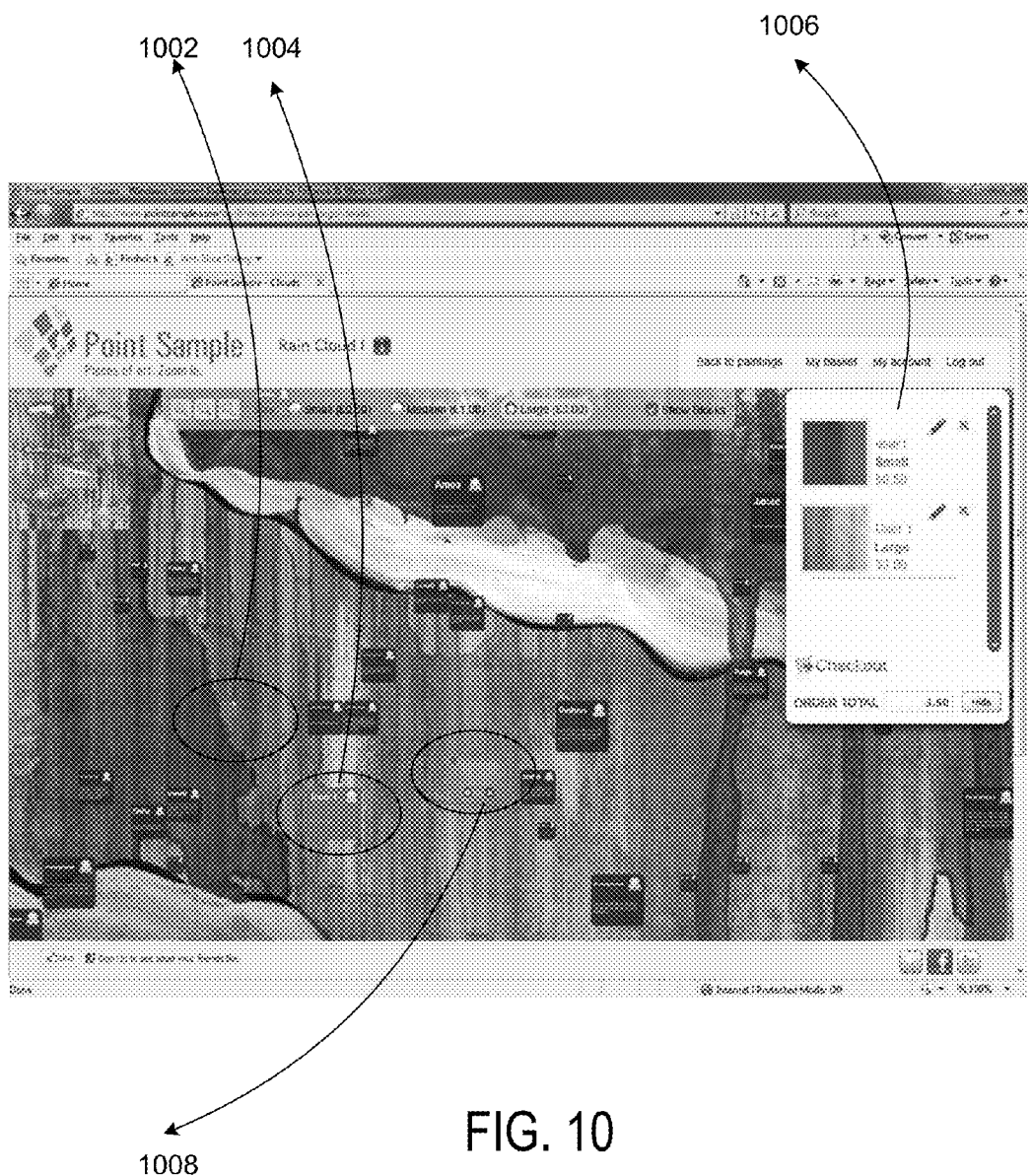
FIG. 10 is an example of a display of the selected image for additional user selections.

A user of the on-demand digital assets service can choose multiple pixel blocks of different sizes. FIG. 10 is an example of a display of the selected image for additional user selections. The red rectangle 1002 represents one of the user's selections: a small sized pixel block, and the red rectangle 1004 represents another one of the user's selected pixel blocks. The red color of the two selections indicates that the status of the selections is reserved or "pending" for payment. The order status of the two selections is displayed in the shopping basket 1006, where each selection is represented by a thumbnail image of the pixel block and related information, e.g., user name, size of the pixel block and price of the selection. The display of the selected image also contains a shopping cart image 1008, corresponding to a location of pixel block currently pointed by the user's mouse. The user can click the location to make another selection of pixel block based on the selected size of pixel block.

Figure 11:
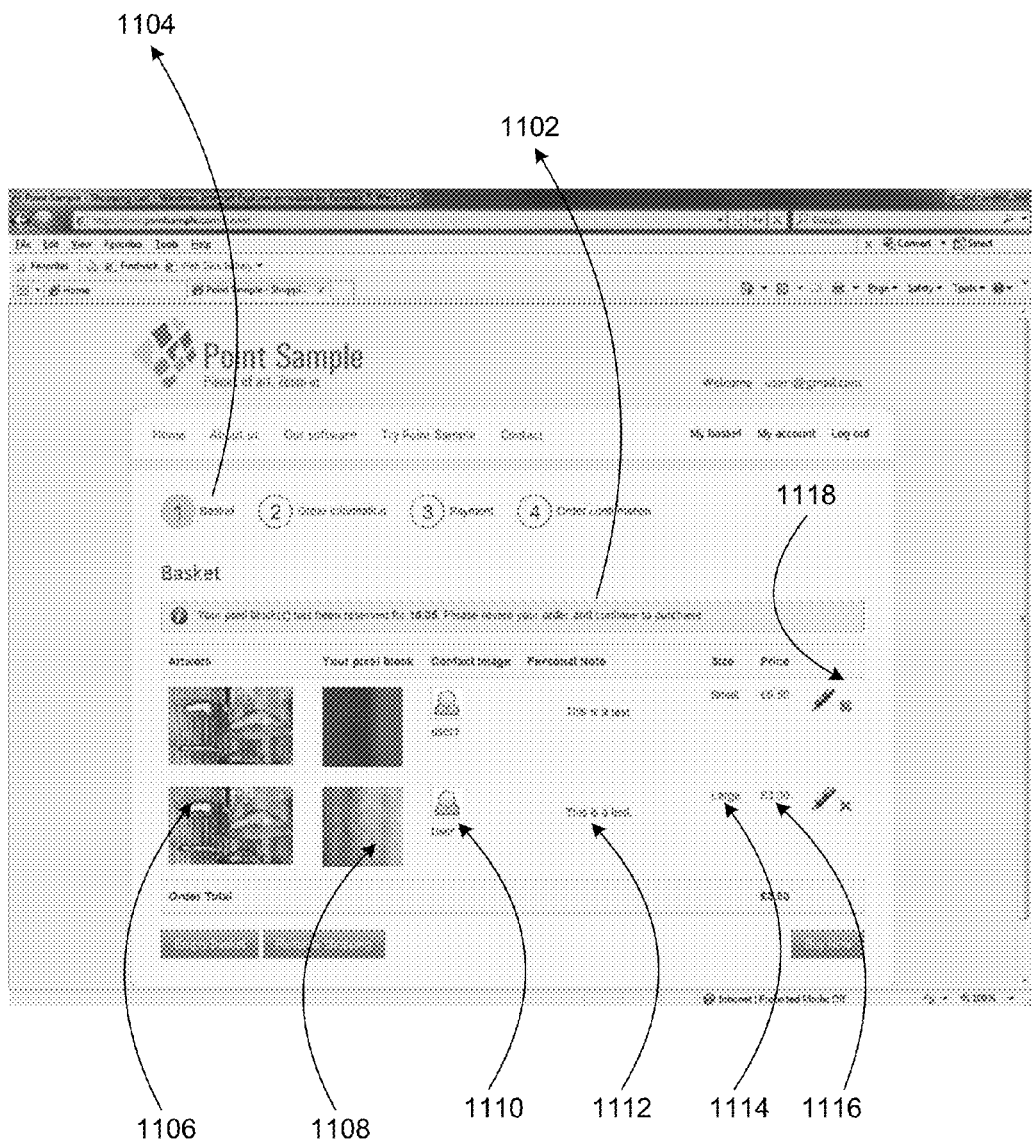
FIG. 11 is an example of a payment user interface for a user to purchase his/her selection(s) of pixel blocks of a selected digital image.

Responsive to user successful selection(s), the hosting service 120 prepares the user to check out. FIG. 11 is an example of a payment user interface for a user to purchase his/her selection(s) of pixel blocks of a selected image. The check-out interface has a check-out processing bar 1104, which shows the steps to complete the check-out. The check-out interface also displays the order (i.e., the selections of pixel blocks) information 1102. For each selection of a pixel block, the order information comprises a thumbnail image of the selected image 1106, a thumbnail image of the selected pixel block 1108, user name 1110, text message associated with the selection of the pixel block 1112, the size of the pixel block 1114, price of the pixel block 1116 and editor tool 1118, which allows the user to modify the text message and/or cancel the selection.

Figure 12:
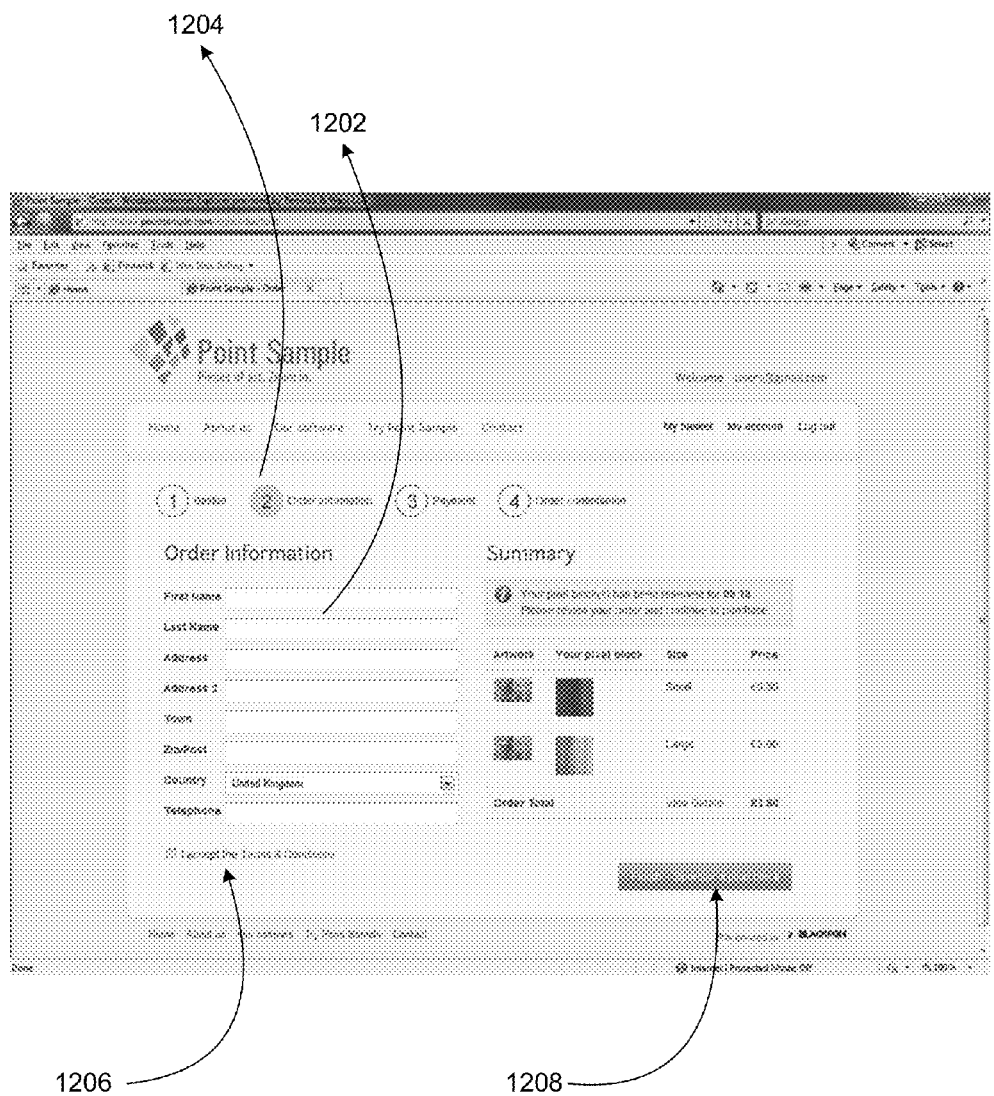
FIG. 12 is an example of an online payment interface for a user to provide payment information.

Once the user is ready to pay for the selections of the pixel blocks, the hosting service 120 presents the user a payment user interface to collect payment related information. FIG. 12 is an example of an online payment interface for a user to provide payment information. The status of the payment transaction is displayed at the top of the payment interface 1204. A user can enter his/her payment information, e.g., user name (first name, last name), address (street, zip code, country) and contact information (telephone number). A user can accept the terms and conditions of the purchase order by clicking the acceptance box 1206 and finishes the purchase by clicking the "finish" button 1208. The hosting service 120 communicates with an online payment system (e.g., the system 150 of FIG. 1) to process the transaction.

The embodiments of the invention advantageously provide digital rights holders to gain access to an additional revenue stream, and also create a new vehicle for fundraising. A fundraising/donor event/campaign can also be conducted for one time donation, where the revenue can be split in three ways among the digital rights holder, the digital asset hosting service (e.g., the hosting service 120 of FIG. 1) and an online payment system for the online transaction. The fundraising event/campaign can be conducted based on an annuity model, where a user can pay his/her sponsorship of a selected pixel block monthly until the user terminates his/her sponsorship.

The embodiments of the invention can also be applied to community building or other social functions. For example, a business or other organizations can leverage a digital image to engage or develop a community, e.g., by inviting the community member to personalize a portion of the image, e.g., select a portion of the image, and voice his/her opinion through the selection (e.g., a text message associated with the selection). In this scenario, a community member can make the selection free of charge, and the business pays a fixed price on their behalf of using the on-demand digital assets hosting service.

Reference in the specification to "one embodiment" or to "an embodiment" means that a particular feature, structure, or characteristic described in connection with the embodiments is included in at least one embodiment of the invention. The appearances of the phrase "in one embodiment" or "a preferred embodiment" in various places in the specification are not necessarily all referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the invention include process steps and instructions described herein in the form of a method. It should be noted that the process steps and instructions of the invention can be embodied in software, firmware or hardware, and when embodied in software, can be downloaded to reside on and be operated from different platforms used by a variety of operating systems.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the invention is not described with reference to any particular programming language. It will be appreciated that a variety of programming languages may be used to implement the teachings of the invention as described herein, and any references below to specific languages are provided for disclosure of enablement and best mode of the invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the invention is intended to be illustrative, but not limiting, of the scope of the invention.

We claim:

1. A computer method for providing on-demand digital assets hosting services to one or more users, comprising:
   receiving a user selection of a digital representation of a digital asset, the digital representation of the digital asset comprising a plurality of pixel blocks, where one or more of the pixel blocks are each associated with pixel block asset information;
   tracking zoom level of the selected digital representation;
   generating a zoomed version of the digital representation based on the zoom level;
   receiving a user selection of a pixel block of the selected digital representation and a size of pixel block;
   storing an association between the user and the selected pixel block in connection with the asset information for the selected pixel block; and
   displaying the selected pixel block and the association between the user and the selected pixel block in connection with a display of the digital representation of the digital asset.

2. The method of claim 1, wherein the pixel block asset information includes a size of each different type of pixel block and a price of each type of pixel block.

3. The method of claim 1, further comprising:
   determining whether the user selection of a pixel block is valid; and
   displaying a user interface to collect user information in response to the determination that the user selection is valid.

4. The method of claim 3, wherein determining whether the user selection of a pixel block is valid comprises:
   determining whether the pixel block has been selected by another user; and
   responsive to the determination that the pixel block has been selected by another user, displaying an error message.

5. The method of claim 3, wherein the collected user information comprises one or more of the following:
   a user name;
   a picture of the user; and
   a text message associated with the pixel block.

6. The method of claim 1, further comprising:
   displaying a user interface to collect payment information associated with the selected pixel block.

7. The method of claim 1, wherein the digital representation of a digital asset comprises a pyramid of digital presentation of the digital asset at different resolutions, each of which is smaller than original resolution of the digital representation of the digital asset.

8. The method of claim 1, wherein associating the user with the selected pixel block comprises:
   linking user name and a picture of the user with the selected pixel block;
   attaching a text message from the user with the selected pixel block; and
   storing the user name, the pictorial representation of the user and the text message with the pixel block.

9. The method of claim 1, wherein associating the user with the selected pixel block further comprises:
   associating a price with the selected pixel block, wherein the price is determined based on the size of the pixel block.

10. The method of claim 1, wherein displaying the selected pixel block and association of the user with the selected block on the display of the selected digital representation of the digital asset comprises:
    displaying one or more pixel blocks that have been selected by the users and the association of each selected pixel block; and
    displaying an indication of available pixel blocks of the selected digital representation of the digital asset.

11. A non-transitory computer-readable storage medium storing executable computer program instructions for providing on-demand digital assets hosting services to one or more users, the computer program instructions comprising instructions for:
    receiving a user selection of a digital representation of a digital asset, the digital representation of the digital asset comprising a plurality of pixel blocks, where one or more of the pixel blocks are each associated with pixel block asset information;
    tracking zoom level of the selected digital representation;
    generating a zoomed version of the digital representation based on the zoom level;

receiving a user selection of a pixel block of the selected digital representation and a size of pixel block;

storing an association between the user and the selected pixel block in connection with the asset information for the selected pixel block; and displaying the selected pixel block and the association between the user and the selected pixel block in connection with a display of the digital representation of the digital asset.

12. The computer-readable storage medium of claim 11, wherein the pixel block asset information includes a size of each different type of pixel block and a price of each type of pixel block.

13. The computer-readable storage medium of claim 11, further comprising instructions for:

determining whether the user selection of a pixel block is valid; and displaying a user interface to collect user information in response to the determination that the user selection is valid.

14. The computer-readable storage medium of claim 13, wherein the computer program instructions for determining whether the user selection of a pixel block is valid comprise instructions for:

determining whether the pixel block has been selected by another user; and responsive to the determination that the pixel block has been selected by another user, displaying an error message.

15. The computer-readable storage medium of claim 13, wherein the collected user information comprises one or more of the following:

a user name;
a picture of the user; and
a text message associated with the pixel block.

16. The computer-readable storage medium of claim 11, further comprising instructions for:

displaying a user interface to collect payment information associated with the selected pixel block.

17. The computer-readable storage medium of claim 11, wherein the digital representation of a digital asset comprises a pyramid of digital presentation of the digital asset at different resolutions, each of which is smaller than original resolution of the digital representation of the digital asset.

18. The computer-readable storage medium of claim 11, wherein the computer program instructions for associating the user with the selected pixel block comprise instructions for:

linking user name and a picture of the user with the selected pixel block;

attaching a text message from the user with the selected pixel block; and storing the user name, the pictorial representation of the user and the text message with the pixel block.

19. The computer-readable storage medium of claim 11, wherein the computer program instructions for associating the user with the selected pixel block further comprise instructions for:

associating a price with the selected pixel block, wherein the price is determined based on the size of the pixel block.

20. The computer-readable storage medium of claim 11, wherein the computer program instructions for displaying the selected pixel block and association of the user with the selected block on the display of the selected digital representation of the digital asset comprise instructions for:

displaying one or more pixel blocks that have been selected by the users and the association of each selected pixel block; and displaying an indication of available pixel blocks of the selected digital representation of the digital asset.

* * * * *